Dec. 5, 1933.  S. P. NEUHAUSEN  1,937,775
RAKE
Filed July 23, 1931
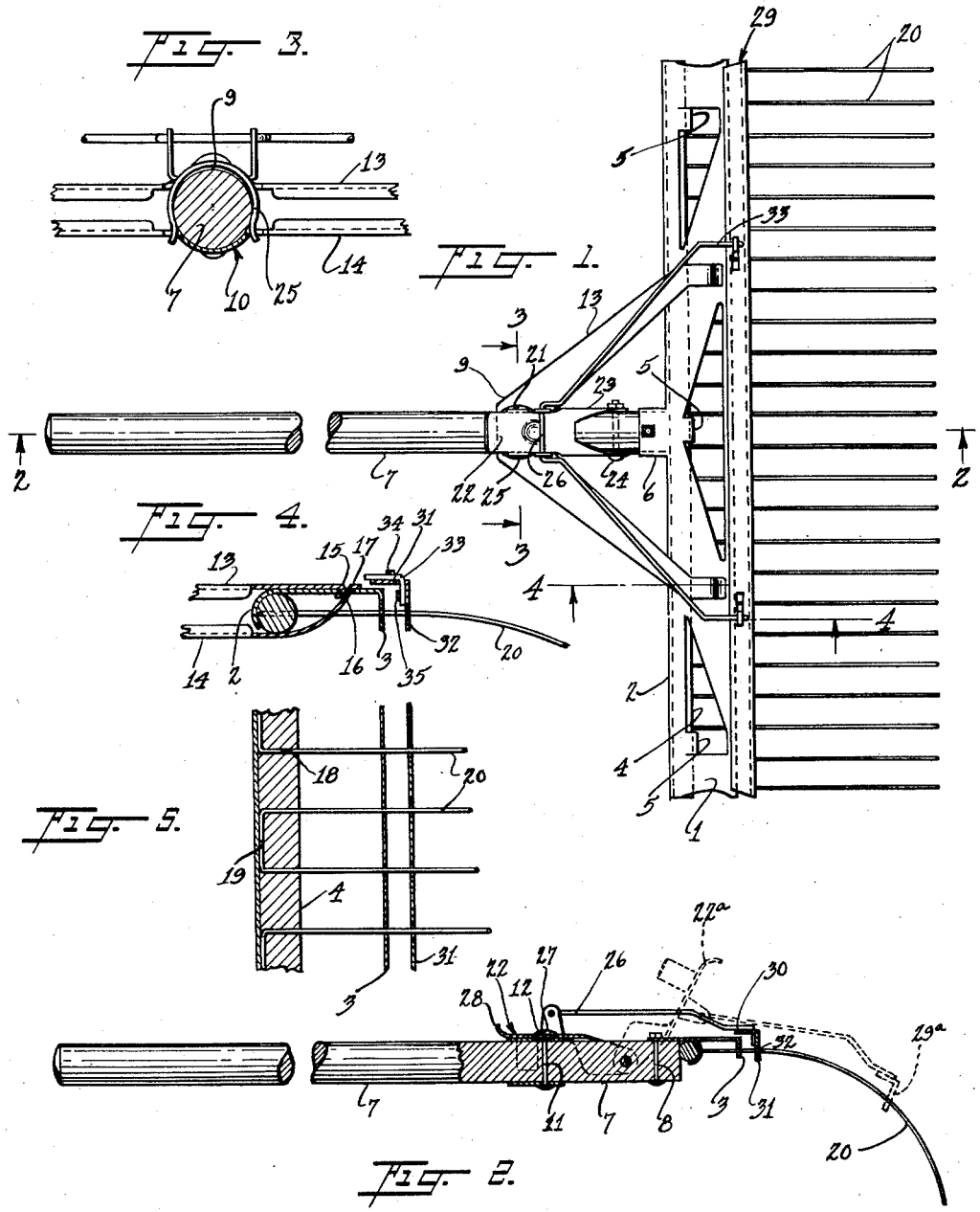
INVENTOR
S. P. Neuhausen
BY
ATTORNEYS Patented Dec. 5, 1933

1,937,775

UNITED STATES PATENT OFFICE 1,937,775

RAKE

Sebastian P. Neuhausen, Lombard, Ill.

Application July 23, 1931. Serial No. 552,757

2 Claims. (Cl. 55—114)

My invention relates to improvements in rakes, and it consists in the combinations, constructions, and arrangements herein described and claimed.

An object of my invention is to provide a rake which is simple in construction and which may be easily and cheaply manufactured.

A further object is to provide a rake which is strong and light in weight.

A further object is to provide a rake having resilient prongs whereby the rake may be utilized for raking around shrubbery, etc. and provided with means whereby said prongs may be made rigid whereby said rake may be used when it is not desired to have the prongs resilient.

Other objects and advantages will appear in the following specification, and the novel features of the invention will be particularly pointed out in the appended claims.

My invention is illustrated in the accompanying drawing, forming part of this application, in which Figure 1 is a top plan view of my device, Figure 2 is a sectional detail view taken along the line 2—2 of Figure 1, portions of the device being shown in elevation, Figure 3 is a sectional detail view taken along the line 3—3 of Figure 1, Figure 4 is a sectional detail view taken along the line 4—4 of Figure 1, and Figure 5 is a sectional detail view showing the construction of the prongs and the structure for anchoring said prongs.

In carrying out my invention, I provide a longitudinal body portion 1 which may be stamped from a sheet of material such as sheet metal. The body 1 has one edge formed for providing an arcuate-shaped retaining portion 2. The opposite side of the body portion is formed for providing an angular or flange portion 3. An elongated cylindrical or prong-retaining member 4 of substantially the same length as the body portion 1 is positioned within the arcuate-shaped portion 2 of the body portion and is held therein by arcuate-shaped finger portions 5 stamped from the body portion and partially extending around said prong-retaining member 4. An edge of the body portion 1 is also formed for providing a projecting portion 6 which may be connected with a handle 7 by any suitable means such as a bolt 8.

Top and bottom reinforcing members 9 and 10 are connected with the handle by any suitable means such as a bolt 11 and a nut 12. The reinforcing member 9 is disposed on the top side of the handle and the reinforcing member 10 is disposed on the under side thereof. The reinforcing member 9 is bifurcated for providing branch portions 13 and in like manner the reinforcing member 10 is bifurcated for providing branch portions 14. As shown in Figure 4, the branch portions 9 extend over the body portion 1 and are formed for providing gripping portions 15 which extend down through openings 16 for engaging the body portion. The branch portions 14 extend beneath the elongated cylindrical portion 4 and pass up through the openings 16 in the body portion. The branch portions 14 are provided with end formations 17 for engaging said body portion. The prong-retaining member 4 is provided with a plurality of spaced-apart openings 18 therein. The openings are arranged in pairs. The paired openings are associated with each other by means of openings 19 in the prong-retaining member.

The flange portion 3 of the body portion 1 is likewise provided with spaced-apart openings in alignment with the openings 18 in the prong-retaining member 4 and through which the prong elements extend. The prong elements 20 are all arcuate-shaped as shown in Figure 2 and terminate at a distance from the body portion. The prong elements are formed from any suitable material such as a resilient or spring wire.

It will be noted on referring to Figures 4 and 5 that the arcuate-shaped portion 2 of the body portion covers the formed ends of the prong elements for holding said elements against displacement. It will be noted on referring to Figure 1 that the top and bottom reinforcing members 9 and 10, respectively, are provided with aligned openings 21 therethrough positioned on opposite sides of the handle member 7. A catch member 22 is positioned on the top side of the handle member 7 and is provided with projecting portions 23 extending on opposite sides of the handle member and adapted for being movably connected with the handle portion by any suitable means such as a bolt 24 whereby said catch member 22 may be hingedly mounted on the handle member 7. The catch member 22 is provided with resilient flange formations 25 positioned on opposite sides thereof and adapted for extending through the openings 21 and engaging the handle member 7 as shown in Figure 3. The catch member 22 is also provided with a pair of upright flanges on opposite sides thereof and provided with aligned openings therethrough for receiving an actuating rod 26. It will be noted on referring to Figure 2 that the catch member 22 is also formed for providing a protuberance 27 whereby the nut 12 may be positioned between the catch member 22 and the reinforcing member 9. The catch member is also formed for providing an arcuate-shaped end portion 28 whereby the same may be easily grasped for being actuated.

A longitudinal angle member 29 is positioned adjacent the flange 3 of the body portion 1 and comprises flange portions 30 and 31. The flange portion 31 is provided with a plurality of spaced-apart openings 32 therethrough equal to and in alignment with the prongs 20, said prongs 20 extending through the openings. The actuating rod member 26 is provided with spaced-apart and angularly shaped end portions 33 which are connected with the angle bar 29 by any suitable means such as stamped-out portions 34 and 35, respectively, associated with the flange portions 31 and 32 of the angle bar 29. It will be noted on referring to Figure 4 that the flange 31 is provided with openings therethrough whereby the portions 33 of the actuating rod may extend therethrough for being connected with the flange 32.

From the foregoing description of the various parts of the device, the operation thereof may be readily understood.

When the rake is used for raking leaves or grass where there is shrubbery such as a hedge, the different members of the device are in the positions shown in Figure 1. If, during the process of raking, the prongs should come in contact with growths having stems of greater diameter than the distance between the prongs, the prongs will merely be spread apart for receiving the stem therebetween. The prongs on each side of the stem will engage the materials being raked and gather them in the usual manner without being interferred with by the stems. It will also be seen that the resiliency of the teeth enables the rake to be drawn over the ground lightly without digging into the same. When it is desired that the prongs may be made rigid such as may be required of a rake for use in a garden, the lever arm 22 is moved to the dotted line position 22a thereby moving the angle bar or movable member 29 to the dotted line position 29a at which time the movable member will function as a reinforcing means for the prongs and will hold them substantially rigid.

Thus it will be seen that a rake is provided having either rigid or resilient prongs as may be desired. The angle bar or movable member 29 may also function as an aid in removing leaves or grass which has become attached to the prongs.

I claim:

1. A rake comprising a handle, a cross member connected with an end of the handle and provided with longitudinally extending front and rear flange portions disposed in spaced positions, a tine retaining member disposed between the flange portions, said cross member being provided with fingers for connecting the tine retaining member therewith, and tines extending through openings in the front flange portion and the tine retaining member, said tines being provided with end portions positioned between the tine retaining member and the rear flange portion for connecting the tines with the cross member.

2. A rake comprising a handle, a cross member connected with an end of the handle and provided with longitudinally extending front and rear flange portions disposed in spaced positions, a tine retaining member disposed between the flange portions, said cross member being provided with fingers for connecting the tine retaining member therewith, tines extending through openings in the front flange portion and the tine retaining member, said tines being provided with end portions positioned between the tine retaining member and the rear flange portion for connecting the tines with the cross member, and reenforcing arms connected with the handle and extending on opposite sides of the cross member, said arms extending through openings in the cross member for reenforcingly connecting the cross member with the handle.

SEBASTIAN P. NEUHAUSEN.